Oct. 19, 1926.
B. LIEBOWITZ
BRAKE
Filed Jan. 20, 1926  2 Sheets-Sheet 1
1,603,965
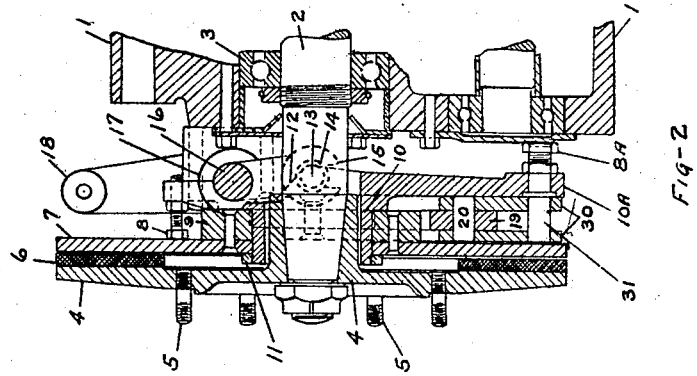
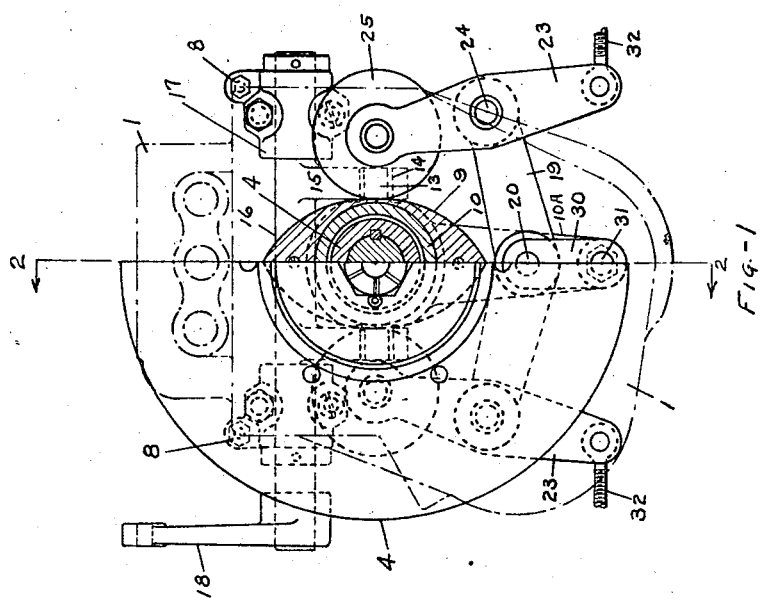
INVENTOR.
Benjamin Liebowitz
BY
ATTORNEY Oct. 19, 1926.   B. LIEBOWITZ   1,603,965

BRAKE

Filed Jan. 20, 1926   2 Sheets-Sheet 2

INVENTOR.
Benjamin Liebowitz
BY
ATTORNEY

Patented Oct. 19, 1926.

1,603,965

UNITED STATES PATENT OFFICE.

BENJAMIN LIEBOWITZ, OF PENNSIDE, PENNSYLVANIA.

BRAKE.

Application filed January 20, 1926. Serial No. 82,557.

My invention relates to brakes for motor vehicles, and more particularly to that type of brake whose reaction is employed to set another brake, as shown in my copending application Serial 19,278, filed March 30, 1925, and the objects of my invention are to provide a large increase in the amount of energy for braking purposes, to achieve this result by simple, inexpensive construction; and, in general, to provide a braking system for motor vehicles, especially for trucks and busses, which will be reliable both as regards setting and releasing, will require infrequent adjustment, and will not make heavy physical demands upon the operator in setting. These, and other objects, such as simpler mechanism, improved equalization means, improved operation, are achieved in the construction, one form of which is shown in the accompanying drawings, in which:

Fig. 1 is an elevation, partly cut away.

Fig. 2 is a section on the line 2—2 of Fig. 1.

Figure 3:
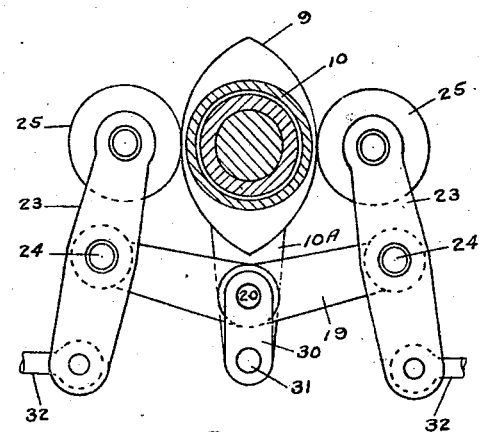
Fig. 3 is a view of the equalizing and expanding means in neutral position.

Referring to the drawings in which I have shown a form adapted to be mounted on the rear end of the transmission of a motor vehicle, 1 represents a fragment of motor vehicle transmission, with main shaft 2 and rear bearing 3. Fastened to the end of the shaft in the usual way is a flanged hub 4, having studs 5 to receive a universal joint 58 of a propeller shaft 59. It will be seen that 4 is directly connected with the propeller shaft, and therefore rotates whenever the vehicle is in action. The flange is larger in diameter, however, than the customary universal-joint-hub flange, and carries a friction disc-lining 6. A second disc 7 is arranged close to the lining 6, the clearance being adjustable by means of bolts 8. Fastened to disc 7 is a two-lobed symmetrical cam 9, which, together with disc 7, is rotatably supported on carrier 10 and held thereon by threaded ring 11. The inside diameter of carrier 10 is large enough to afford clearance at all times between it and the hub of 4.

The carrier 10 has two ears 12 formed with pins 13 working freely in bushings 14 which are carried in the ends of arms 15 extending from the shaft 16 which shaft is carried in bearings 17 mounted on the transmission case 1. Keyed on the end of 16 is lever 18, which is connected by rod or cable, or in any other suitable manner to the brake-pedal or hand brake (not shown). The usual spring (not shown) which serves to keep the brake-pedal in its neutral position may also serve to hold lever 18 back, so as to press disc 7 firmly against the clearance-adjusting bolts 8. The disc 7 is thus held normally out of contact with lining 6 and no part of its mounting contacts with rotating parts. When, however, lever 18 is pulled forward by depressing the brake-pedal, disc 7 is brought into contact with the lining 6, and if the vehicle is in motion, or tends to move 7, tends to be carried around with 6, thereby rotating cam 9.

The carrier 10 has a downward extension 10$^a$, which carries a pin 31 on which is pivoted the links 30. A bar 19 is pivoted to link 30 at 20, substantially at the mid-point of bar 19. At each end of 19 is a pin 24 by means of which the pair of levers 23 are pivotally supported. The upper ends of levers 23 carry large rollers 25 which bear against diametrically opposite points of cam 9. The lower end of each lever 23 carries a threaded eye 32.

Each of these eyes 32 is fastened to a rod 51 which connects with a bell-crank 52, mounted, for example, on the side-rail 53 of the chassis. Each bell-crank in turn is connected by a rod 54 to a lever 55 keyed to a brake actuating shaft 56, by means of which brakes 57 are set. The arrangement of parts 53, 54, 55, 56, 57 may be varied in any conventional or convenient manner and may be adapted for any number of brakes.

Figure 4:
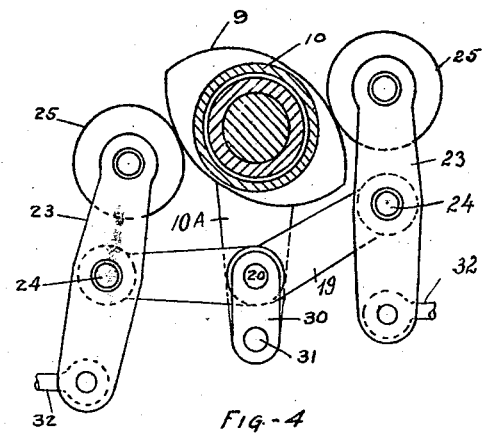
Fig. 4 is a view showing the same in an intermediate position.

Referring to Fig. 4, it will be seen that the torque reactions set up in the mechanism are resisted by tensions in rods 51, which are connected to the mechanism through the eyes 32, and thereby cause a twisting action which rotate the line joining the eye-centers 32—32 from the horizontal. This action is not disadvantageous—in fact it has the advantage of increasing the angle of rotation of cam 9 and thereby increasing the energy available—unless it becomes too large for the clearance available.

Figure 5:
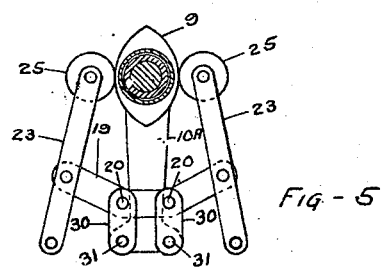
Fig. 5 is a view showing a modification of said means.

These twisting actions may be taken up within the equalizing mechanism itself by doubling up pins 31 and 20 and links 30, as shown in Fig. 5. In this case the torque reactions are taken ultimately by pins 14, thence through shaft 16 by bearing brackets 17.

It will be observed that there is no longitudinal relative motion between cam 9 and rollers 25 when the brake is being set or released, because in this construction, the cam 9 directly and the rollers indirectly are mounted on the same part, namely cam carrier 10.

The mode of operation is as follows: When the vehicle is moving or tends to move and the operator depresses the brake-pedal (or hand-lever, as the case may be), lever 18 is pulled forward, thereby moving the arms 15 backward and pressing disc 7 against brake-lining 6 with a force depending on the pedal pressure. Flange 4, being directly connected to the propeller shaft, is in motion or tends to move, so that disc 7 tends to be rotated by flange 4. Cam 9 is thereby rotated, thus forcing the rollers 25 apart, causing levers 23 to rock on pivots 24, thereby drawing inward eyes 32, which pull on rods 51 and in turn, through bell-cranks 52 apply tension to rods 54 to operate the brakes 57. When this action has proceeded to the point where all slack in the connections and all clearances have been taken up, the brake-setting forces acting on the eyes 32 through the chain of mechanism induce a reaction between rollers 25 and cam 9 and prevent further rotation of the latter, so that slipping thereafter occurs between disc 7 and lining 6. It will readily be seen that the brake-setting forces exerted by levers 23 are proportional to the pull on lever 18, other things being equal, provided that cam 9 is of constant rise.

When the operator releases the brake-pedal (or hand brake) the pull of the brake-connections on levers 23, aided by springs not shown, tends to restore the system to its neutral or non-operative position, by the pressure of rollers 25 against cam 9. That this may be accomplished, there must be no binding forces in the mechanism, and the angle of the cam 9 must be sufficiently large, with due regard paid to diameters of rollers 25 and their pivots 24. These conditions are fulfilled in the construction shown.

Figure 6:
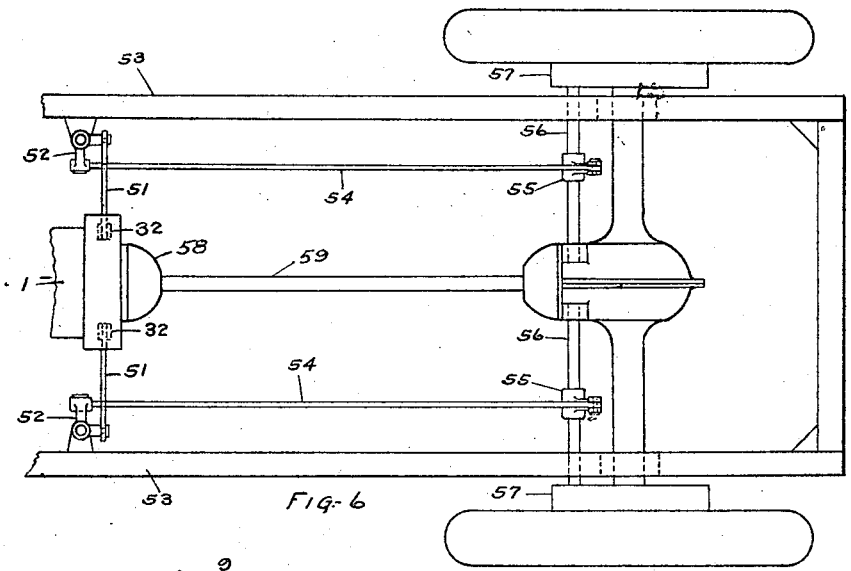
Fig. 6 is a diagrammatic plan view of a motor vehicle showing the mechanism connected with the brakes.

It should be observed, in the first place, that the forces exerted by the eyes 32 are equalized by virtue of the equalizer bar 19. If each of the eyes 32 is connected to a rear-wheel brake as in Fig. 6, no further equalization is necessary. Equalization is insured by virtue of action of link 30.

In the second place, by virtue of this equalization, no binding forces are brought into action between cam 9 and carrier 10. Were it not for this equalization high bearing pressures would be induced between 9 and 10, and these pressures would oppose the release of the brake; hence, the tendency of the brake to stick is obviated by the balanced reaction of the two rollers 25 on the cam 9. Complete release of the brake is therefor assured by the pressure of the rollers 25 on cam 9 caused by springs not shown, especially in view of the very liberal roller diameters and cam angle, so that the lines of action of the resultant restoring forces are far outside the cone of friction.

In the third place, because of the symmetry of the cam, the brake functions equally well, whether the vehicle is going forward or backward.

In the fourth place, the cam has a useful angle of rotation of almost 90 degrees, and is fundamentally because of this large angle of rotation that this pilot brake is able to deliver so much energy.

The cam 9 is shown symmetrical, but it may take other forms.

My invention is shown in this specification as mounted at the rear end of the transmission, but it will be understood that it may be mounted at either end of, or at any convenient point along the propeller-shaft, or any other shaft permanently connected with or geared to the wheels. Furthermore the invention is not to be construed as limited to the specific embodiment shown.

What I claim is:

1. In combination with the brakes and a rotating part of a motor vehicle, a mechanism for applying the brakes with equalized pressure comprising a member movable into engagement with the rotating part to rotate frictionally therewith, a cam connected with said member to move angularly upon rotation thereof, a pair of followers each bearing against an opposite part of the cam, and pivoted equalizing means connecting the followers together, and operative connections between the followers and the brakes.

2. In combination with the brakes and a rotating part of a motor vehicle, a mechanism for applying the brakes with equalized pressure comprising a member movable into engagement with the rotating part to rotate frictionally therewith, a carrier for said member, a cam mounted on the carrier, a pair of followers each bearing against an opposite part of the cam, an equalizing bar connecting the followers together and pivotally supported on the carrier, and operative connections between the followers and the brakes.

3. In a mechanism of the character described, a carrier, a cam mounted to turn angularly on said carrier, a pair of followers each bearing against an opposite part of the cam, and an equalizing bar connecting the followers together and linked to the carrier.

4. In a mechanism of the character described, a cam, a pair of followers each bearing against an opposite part of the cam, and pivoted equalizing means connecting the followers together.

5. In a mechanism for applying the brakes of a motor vehicle with equalized pressure, a longitudinally movable carrier, a cam mounted to turn angularly on the carrier, rollers each bearing against an opposite part of the cam, levers each carrying a roller at one end and having its other end operatively connected with one of the brakes, and an equalizing bar pivotally secured at its ends to said levers respectively, the equalizing bar being supported intermediate its ends on links pivotally secured to a part of the carrier.

BENJAMIN LIEBOWITZ.